(No Model.)
J. G. NICHOLS.
FLEXIBLE SHAFT.
No. 297,085. Patented Apr. 15, 1884.
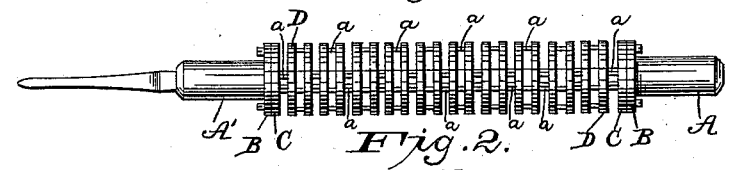
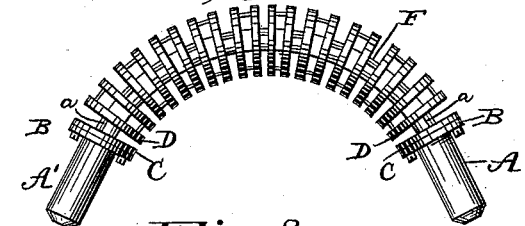
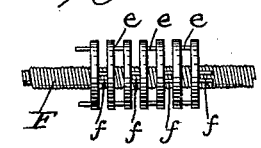
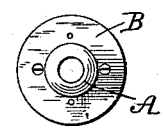
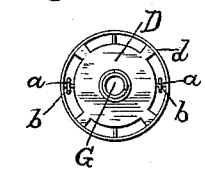
Witnesses:
Inventor:
J. G. Nichols

UNITED STATES PATENT OFFICE.

JOHN G. NICHOLS, OF HOLTON, KANSAS.

FLEXIBLE SHAFT.

SPECIFICATION forming part of Letters Patent No. 297,085, dated April 15, 1884.

Application filed January 26, 1884. (No model.)

*To all whom it may concern:*

Be it known that I, J. G. NICHOLS, a citizen of the United States, residing at Holton, in the county of Jackson and State of Kansas, have invented certain new and useful Improvements in Flexible Shafts or Couplings, of which the following is a specification, reference being had therein to the accompanying drawings.

My invention relates to improvements in flexible shafts or couplings.

The object of my invention is to provide a simple and efficient flexible shafting or coupling, by which power is conveyed from one shaft to another when they are not in line, or where one is at an angle to the other.

My invention consists of a series of disks or other-shaped sections having their sides parallel to each other and flexibly connected together and to the adjacent ends of the shafting, said disks being steadied or held in place or in alignment by a flexible core or by an external support, as will more fully appear.

Figure 1 is a side view of my improved flexible shaft or coupling. Fig. 2 is a similar view, showing the shaft in a bent or flexed position. Fig. 3 is a side view of a portion of the flexible coupling, showing the internal flexible core or support. Fig. 4 is an end view, and Fig. 5 is a side view, of one of the disks.

My invention is designed more especially for use in dental drills and for uses where short bends are to be made in the shafting in order to get the point of the drill into places otherwise inaccessible; but I do not confine myself to this use alone, as it is obvious that it may be used to like advantage in rock and mining drills when the drills are operated in a rotary manner, or rather as a boring-tool.

My invention is also applicable, when the disks are made of a proper size, to connect the shafting of machinery, or, where it is desirable, to impart motion to shafting which lies at an angle to the main driving-shaft. In short, my device is applicable to all machinery and all places where a flexible coupling or universal joint may be required.

I will now proceed to describe the construction of my improved flexible coupling.

A and A' designate two sections of shafting joined together by my flexible coupling. The sections A and A' are provided with circular flanges or disks B, to which are rigidly secured the disks C by means of bolts or screws, as may be desired. The disks C are connected to the disks D by the links $a$, one on each side, by the pins $b$, which pass through the open portions of the links, as shown in Fig. 5.

The form of disk which I prefer to use for light work is shown in Fig. 5, and consists of a metal or other disk having portions of its periphery cut away, so as to form open spaces, in which the links are secured, and which admit of the links being turned at an angle. After each disk has been placed in position and joined to the adjacent disk by the links, a ring or band, $d$, is placed around the outer edge of the disk, which holds the links in their places on the pins $b$.

D are the disks which form the main body of the shaft or coupling. They are arranged side by side, as shown, and are joined, as described, by links, the links being connected alternately on opposite sides of the disks, as shown at $e$ and $f$, Fig. 3.

F is a flexible core or internal support, on which the disks are loosely mounted by passing the same through the central opening, G. This central support or core is not connected to the disks or to the shafting, but is simply held in place by the disks, and forms a support to keep the disks in place and in proper alignment. For this flexible core or central support I have shown a double spiral spring, one fitting within the other; but I do not limit myself to the use of a double spring, as a core or support of leather, rubber, or other flexible material may be used to advantage; and instead of the central core, I may use an outside covering of any suitable form or material for the same purpose.

The disks or pieces D, which form the coupling, may be made of any suitable form or size, and may be connected by links, bars, stays, cogs, or in any suitable manner to produce the desired result.

In the drawings I have shown a coupling composed of twenty disks. With this number the coupling will work from zero to ninetyfive degrees perfectly smooth, and, by adding more disks, can be made to work the complete circle; and the power or strength of the coupling is only limited by the size and strength of the material used in its construction.

Having thus described my invention, what I claim, and desire to secure by Letters Patent, is—

1. A flexible coupling for shafts and other purposes, consisting of a series of disks arranged as described, flexibly connected together and to the ends of the shafts, as set forth.

2. A flexible coupling for shafts, consisting of a series of disks, the sides of which are arranged parallel to each other, said disks being flexibly connected together and held in alignment by a flexible support, as and for the purpose set forth.

3. A flexible coupling for shafts, consisting of a series of disks connected together, as described, and held in alignment by a central flexible support, as set forth.

4. In a flexible coupling, the disks D, formed with open spaces or recesses, in which are secured the links $a$ by means of pins $b$ and band $d$, secured to the projecting portions of the disk, as set forth.

In testimony whereof I affix my signature in presence of two witnesses.

JOHN G. NICHOLS.

Witnesses:
SAMUEL OSTERHOLD,
JOHN T. SCOTT.